United States Patent [19]

Fulk

[11] E Re. 29,794

[45] Reissued Oct. 3, 1978

[54] METHOD OF PRODUCING WEB UNITS

[75] Inventor: James B. Fulk, Monte Sereno, Calif.

[73] Assignee: Paper Converting Machine Company, Green Bay, Wis.

[21] Appl. No.: 638,767

[22] Filed: Dec. 8, 1975

Related U.S. Patent Documents

Reissue of:

[64] Patent No.: 3,596,899
Issued: Aug. 3, 1971
Appl. No.: 859,020
Filed: Sep. 18, 1969

[51] Int. Cl.[2] ..... B65H 41/00
[52] U.S. Cl. ..... 270/52.5
[58] Field of Search ..... 270/52.5, 37, 53, 18; 101/219-228, 178-180, 90; 197/132

[56] References Cited

U.S. PATENT DOCUMENTS

| | | | |
|---|---|---|---|
| 2,201,407 | 5/1940 | Pfeiffer | 197/132 |
| 2,334,283 | 11/1943 | Pfeiffer | 270/52.5 |
| 2,360,965 | 10/1944 | Mosher | 270/52.5 |
| 2,975,989 | 3/1961 | Hinman | 270/52.5 |
| 3,147,006 | 9/1964 | Fulk | 270/18 |
| 3,399,884 | 9/1968 | Bahrani | 270/52 |
| 3,418,927 | 12/1968 | Mita | 101/90 |

FOREIGN PATENT DOCUMENTS

| | | | |
|---|---|---|---|
| 472,638 | 9/1937 | United Kingdom | 270/52.5 |

*Primary Examiner*—Edgar S. Burr
*Assistant Examiner*—A. Heinz
*Attorney, Agent, or Firm*—Teare, Teare & Sammon

[57] ABSTRACT

A method of producing web units wherein at least two units are simultaneously processed while in superimposed relation, and thereafter the units are laterally separated — the invention finding particular utility in connection with business forms.

11 Claims, 2 Drawing Figures

Inventor
James B. Fulk
by: Dawson, Tilton, Fallon & Lungmus
Atty's

Inventor
James B. Fulk
by: Dawson, Tilton, Fallon & Lungmus
Atty's

METHOD OF PRODUCING WEB UNITS

Matter enclosed in heavy brackets [ ] appears in the original patent but forms no part of this reissue specification; matter printed in italics indicates the additions made by reissue.

BACKGROUND AND SUMMARY OF INVENTION

The advantages of the invention can be most quickly understood when discussed in terms of the manufacture of business forms; however, it will be appreciated that the invention is adapted for many diverse applications. In the manufacture of business forms, particularly when increased production is desired, the art has turned to wider machines. In a typical business form machine, webs are unwound from parent rolls, directed through printing units, thereafter conducted through processing units (commonly referred to as "specifications") which can include operations such as across perforation, pinhole punching, crash numbering, crimp locking, linehole punching, etc., and are thereafter zigzag folded. When the art has faced the problem of needed increased production, these machines have been made wider. Where the printing mechanism has been made wider, immediate disadvantages attend. The widening of the printing press plate has necessitated increasing the diameter, which, in turn, necessitated additional plates, creating problems of register, cost of the machine, etc. The advantages of the narrow parent rolls of web material, which include superior quality and greater handleability are also lost when wider machines are turned to. In particular, the various specifications have to be duplicated across the web when wider machines are utilized. These disadvantages are avoided, and corresponding advantages provided through the practice of the invention.

*This application is a reissue of application Ser. No. 859,020 filed Sept. 18, 1969, now U.S. Pat. No. 3,596,899 issued Aug. 3, 1971.*

DETAILED DESCRIPTION

Figure 1:
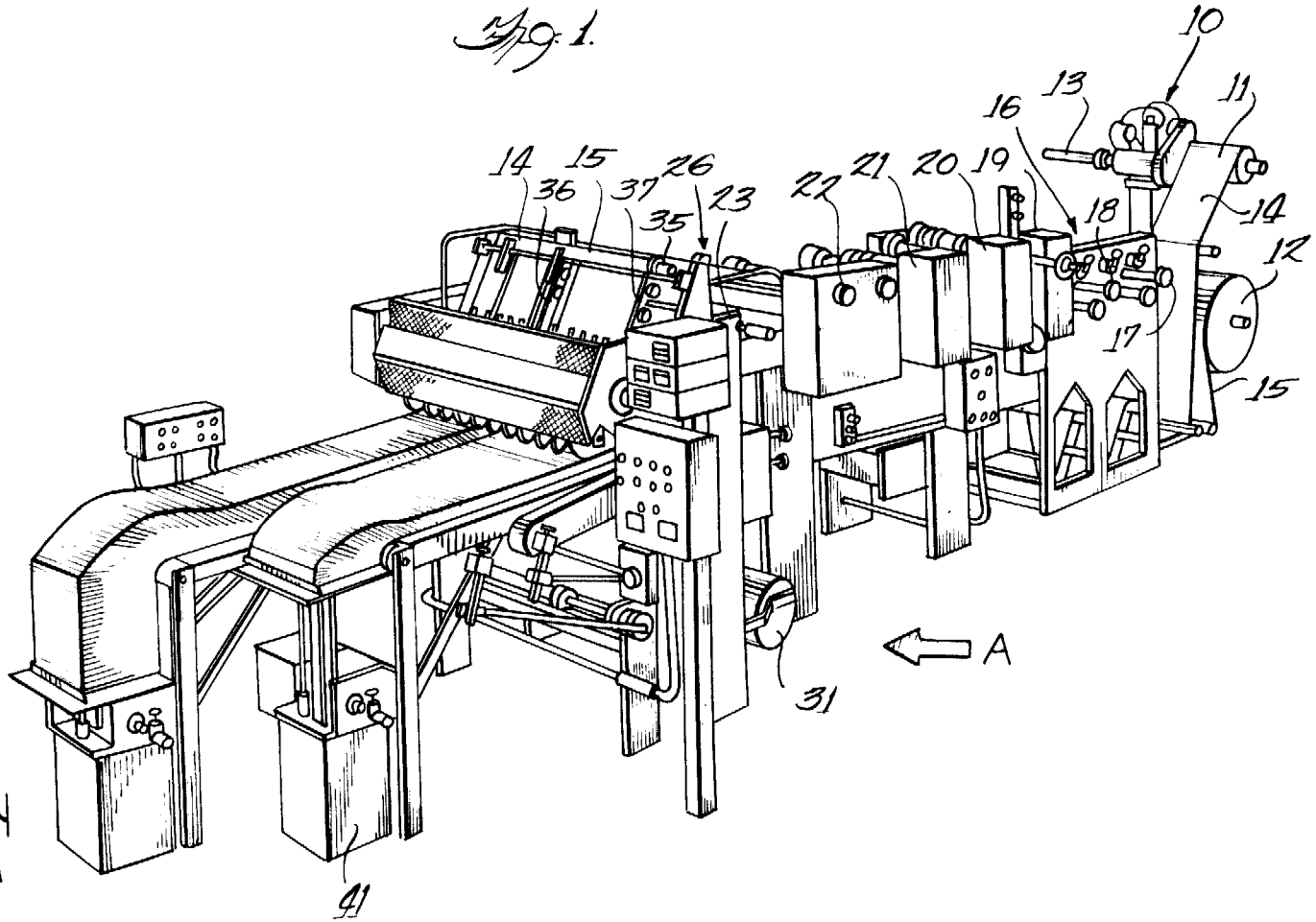
Figure 2:
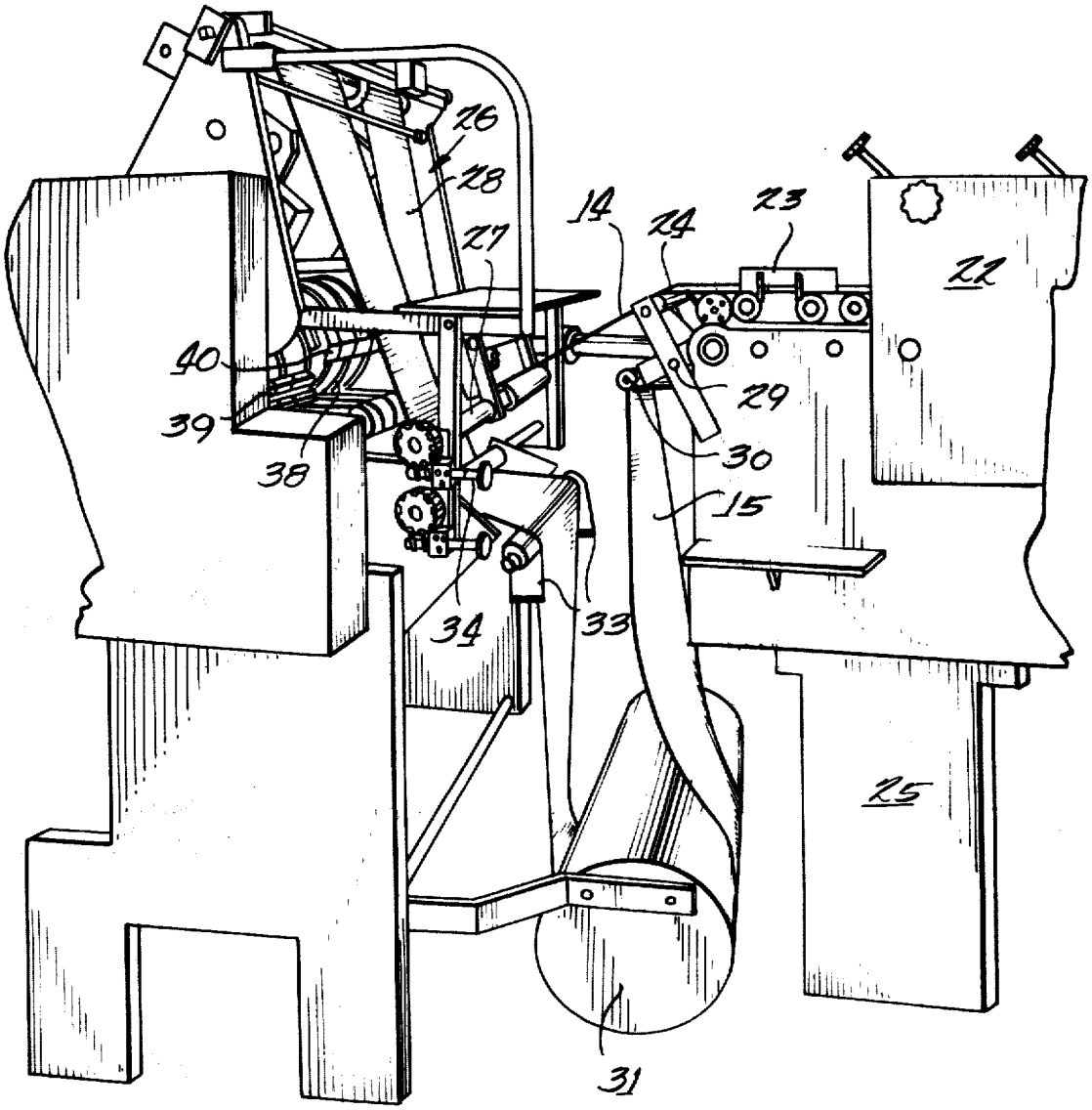

The invention is described in conjunction with an illustrative embodiment in the accompanying drawing, in which:

FIG. 1 is a perspective view of apparatus incorporating teachings of this invention; and FIG. 2 is a fragmentary perspective view of the apparatus of FIG. 1 looking essentially forward in the direction of web travel, as from the station designated A in FIG. 1.

In the illustration given, and with particular reference to FIG. 1, the numeral 10 designates generally an unwind mechanism. The unwind mechanism 10, as illustrated, supports a pair of parent rolls 11 and 12. The material unwound from the parent rolls is termed herein as a web unit, and the term "web unit" can refer to either a single thickness of web material or to a plurality of thicknesses of web material. It will also be appreciated that a number of parent rolls can be unwound simultaneously, but, for the purpose of ease in explaining the invention, a simple version is presented. The unwind mechanism 10 is seen to be equipped with additional mandrels, as at 13, which are used to carry replacement parent rolls so that substantially continuous operation is achieved. For example, after a given parent roll 11 or 12 is exhausted, the unwind mechanism 10 is rotated 180° (as illustrated) to position a new parent roll for supplying a web—this being spliced to the trailing edge of the web issuing from the exhausted parent roll.

In the illustration given, the web units 14 and 15 are advanced into a first processing station generally designated 16. In the illustration given, this is a printing press arrangement which permits separate processing or printing of the webs 14 and 15. Thus, it is possible to impress different information on the different web units 14 and 15. As indicated previously, it is possible to increase the number of web units, and it will be appreciated that in such instance it is possible to increase the number of printing presses provided in the station 16. For example, the numeral 17 designates the adjustment hand knob of the press portion which imprints the web unit 14, while the numeral 18 designates the adjustment hand knob for the press portion employed to print the web unit 15.

After the web units have been initially processed separately, the same are brought together in superposed relation for simultaneous processing of the character hereinbefore indicated. For example, the superimposed webs are directed to a file hole punch 19, thence to a line hole punch 20, thence to another file hole punch 21, and thereafter to a cross perforator 22. Details of the foregoing type of simultaneous processing can be seen in my earlier patents.

The superposed web units 14 and 15 are advanced by the tractor unit 23 just prior to the lateral separation operation which can be seen by reference to FIG. 2. In FIG. 2, the webs 14 and 15 pass over an idler roll 24 suitably supported on the main frame 25. The upper web unit 14 (in the illustration shown) follows a direct path (i.e., no lateral translation) to the folding mechanism generally designated 26. The web 14 is seen to pass under another idler roll, as at 27, before entering an upward run, as at 28, just prior to being zigzag folded.

The lower web unit 15 is directed around an idler roll 29, and then over a skewed member 30. This results in the festooning depicted in the central lower portion of FIG. 2, the web unit 15 passing around a stationary drum 31. Thereafter the travel of the web 15 includes passing over a second skewed member 32 which is seen to be equipped with guide elements 33. Thereafter the web follows a path generally upwardly, engaging suitable idler rolls as at 34 for entering the folding mechanism 26.

It will be seen that the net result of the operations described thus far is the same as that which would have been achieved with a "two wide" machine, but without any of the attendant disadvantages. Among the advantages that attend the use of the invention is that it permits using one around plates because the cylinder is small diameter and can run at high speed, i.e., in excess of about 1,000 feet per minute. With a wider plate cylinder there is the disadvantageous deflection which renders high speed operation difficult. The invention also permits the use of different colors and different kinds of paper. It will be appreciated that an important advantage of the invention, particularly from the standpoint of the user, is the reduced cost of the machine. Using narrower parent rolls means that they are easier to control, and narrower parent rolls conveniently are superior, wider rolls often having loose edges, etc. The inventory through the use of the invention is the normal inventory for multiple copy forms, since the usual parent roll inventory is maintained for narrow machines. The invention also makes possible the running of two jobs at one time, which, in turn, permits reduction of the inventory of stock forms, i.e., finished goods forms. As indicated previously, all of the specifications, i.e., file hole, line hole, etc., are easier to set up because this is required only once rather than two or more times. The artisan does not have to "match up" the two setups. The important "make ready" time is greatly reduced.

In the illustration given, the folding mechanism 26 can also be seen in FIG. 1. As the webs 14 and 15 change direction by virtue of being partially wrapped about turnaround member 35, the webs proceed downwardly, and are conducted in a controlled fashion by means of pinned belts associated with tractor units 36 and 37. It will be appreciated that these units are essentially the same as the tractor unit 23.

The webs thereafter enter a zigzag folder, a portion of which can be seen in FIG. 2. The zigzag folder portion seen in FIG. 2 is constructed according to the teachings of U.S. Pat. No. 3,195,882. The folding rolls are two-wide to accommodate the two webs 14 and 15. The rear folding roll 38, which, as indicated, is "two-wide", thus has the folding elements for the two webs disposed about a common axis. These elements are offset from each other, as can be appreciated from the gripper elements 39 and 40, so that the folding of one web unit is longitudinally spaced from the folding of an adjacent web unit.

The folding mechanism 26 is run at high speed, and this is facilitated through the slack introduced in the web units, hereinbefore referred to.

It will be appreciated that other arrangements of apparatus are comprehended within the scope of this invention. For example, in certain instances, it may be desirable to utilize rewind elements following lateral separation, instead of utilizing the folding mechanism described herein. However, the zigzag folder described herein operates advantageously in conjunction with multiple copy forms seen issuing at the extreme left in FIG. 1 which are collected on suitable descenders 41.

I cannot emphasize sufficiently the advantages that accrue from utilizing the narrower machine. Those skilled in the art have found that serious speed limitations inhere with wider machines at many positions or stations along the machine, i.e., at all specifications. In the present machine, the only wider element is the folder mechanism 36. By having a common shaft but individual grippers for the two web units—the grippers being individually actuated—I have avoided any speed limitations that ordinarily would arise from the wider folding mechanism.

I claim:

[1. A method of producing a plurality of web units comprising:

simultaneously processing at least two of said units while the same are in superposed relation, and thereafter laterally separating said units for further processing.]

2. The method of claim [1] *15* in which said units are initially processed separately.

3. The method of claim 2 in which said initial processing includes the step of printing.

4. The method of claim [1] *15* in which said simultaneous processing includes one or more of the following: cross perforation, file hole punching, crash numbering, crimp locking, line hole punching, or a like operation adapted for use with business forms.

5. The method of claim [1] *15* in which each web unit is a single thickness web.

6. The method of claim [1] *15* in which at least one of said web units includes a plurality of web thicknesses.

7. The method of claim [1] *15* in which said web units are folded subsequent to [lateral] separation[.] *and lateral movement of at least one of the webs.*

8. The method of claim 7 in which said web units are zigzag folded.

[9. The method of claim 1 in which one of said web units is skewed twice.]

[10. The method of claim 9 in which said one web unit is guided during the second skewing.]

[11. The method of claim 9 in which said web units are folded about a common axis.]

[12. The method of claim 11 in which the folding of one web unit is longitudinally spaced from the folding of an adjacent web unit. ]

13. The method of claim [1] *15* in which said web units are slack during [lateral] separation [.] *and lateral movement.*

14. The method of claim 13 in which said web units are engaged by pinned belts after [lateral] separation [.] *and lateral movement.*

*15. A method of manufacturing business forms from rolls of paper webs comprising:*

*advancing the webs from the rolls into a contiguous superimposed relationship along a common straight line path, processing the webs simultaneously while they are moving*

*in said superimposed relationship,*

*maintaining a first one of the webs along said straight line path*

*advancing a second of said webs laterally into a path which is parallel to the path of said first web to separate said first and second webs and*

*performing a further processing operation on said first and second webs after said separation,*

*all of said processing operations occurring while the webs are moving continuously from said rolls.*

*16. The method of claim 15 in which said second web is moved into the form of a festoon after said separation.*

* * * * *